United States Patent [19]

Dupin

[11] Patent Number: 5,114,276
[45] Date of Patent: May 19, 1992

[54] APPARATUS AND METHOD FOR MOORING A FLOATING VESSEL

[75] Inventor: Richard M. Dupin, Brea, Calif.

[73] Assignee: Union Oil Company of California, dba UNOCAL, Los Angeles, Calif.

[21] Appl. No.: 490,740

[22] Filed: Mar. 8, 1990

[51] Int. Cl.$^5$ .............................................. B63B 21/50
[52] U.S. Cl. .................................. 405/224; 405/223.1; 52/704; 114/294; 403/263
[58] Field of Search ............... 405/195, 203, 205, 224, 405/DIG. 8; 52/148, 704, 296; 114/265, 294; 403/5, 263

[56] References Cited

U.S. PATENT DOCUMENTS

| | | | |
|---|---|---|---|
| 2,952,947 | 9/1960 | White | 52/704 X |
| 3,648,638 | 3/1972 | Blenkarn | 114/265 |
| 3,676,965 | 7/1972 | Deike | 52/296 X |
| 4,459,933 | 7/1984 | Burchett | 405/224 X |
| 4,596,494 | 6/1986 | Manesse et al. | 405/224 X |
| 4,611,953 | 9/1986 | Owens | 405/224 |
| 4,838,736 | 6/1989 | Moore | 405/224 |

FOREIGN PATENT DOCUMENTS

| | | | |
|---|---|---|---|
| 1463696 | 12/1966 | France | 405/195 |
| 8911415 | 11/1989 | World Int. Prop. O. | 405/224 |

*Primary Examiner*—Dennis L. Taylor
*Assistant Examiner*—John A. Ricci
*Attorney, Agent, or Firm*—Gregory F. Wirzbicki; Clark E. DeLarvin

[57] ABSTRACT

An elongated housing having opposite ends is embedded in the sea floor. One end extends downwardly a substantial distance into the sea floor and the other end terminates adjacent the surface of the sea floor. The housing has an axially, vertically extending passageway therethrough. A tension member is located in the passageway and has one end connected to a lower portion of the housing and an upper end for connection to a floating vessel. Advantageously, means are provided for ensuring that substantially any vertical load transmitted to the tension member is transmitted to a lower portion of the elongated housing. In accordance with a preferred embodiment, means are provided for ensuring that any horizontal force components are transmitted to an upper portion of the elongated housing.

31 Claims, 2 Drawing Sheets

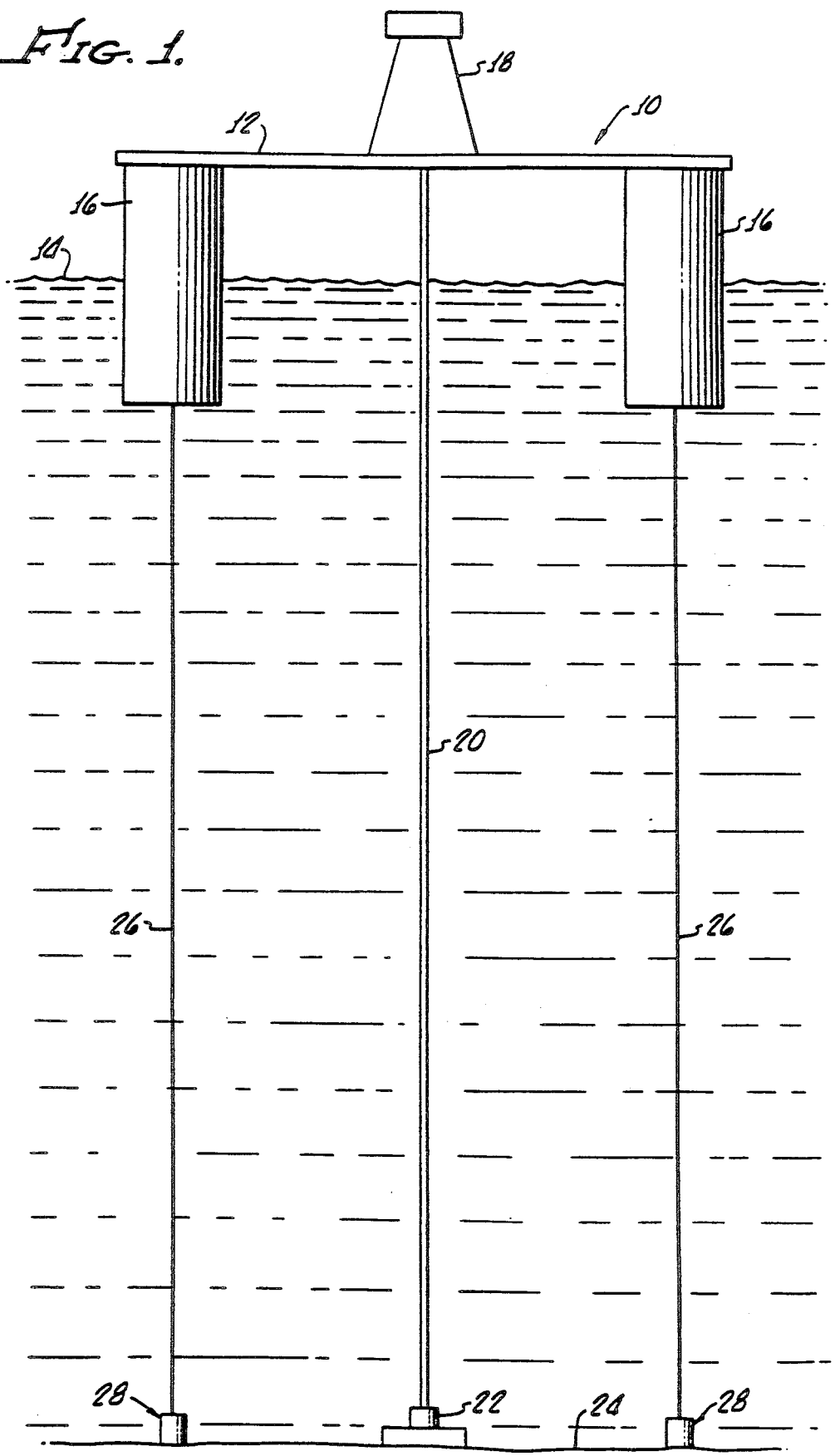

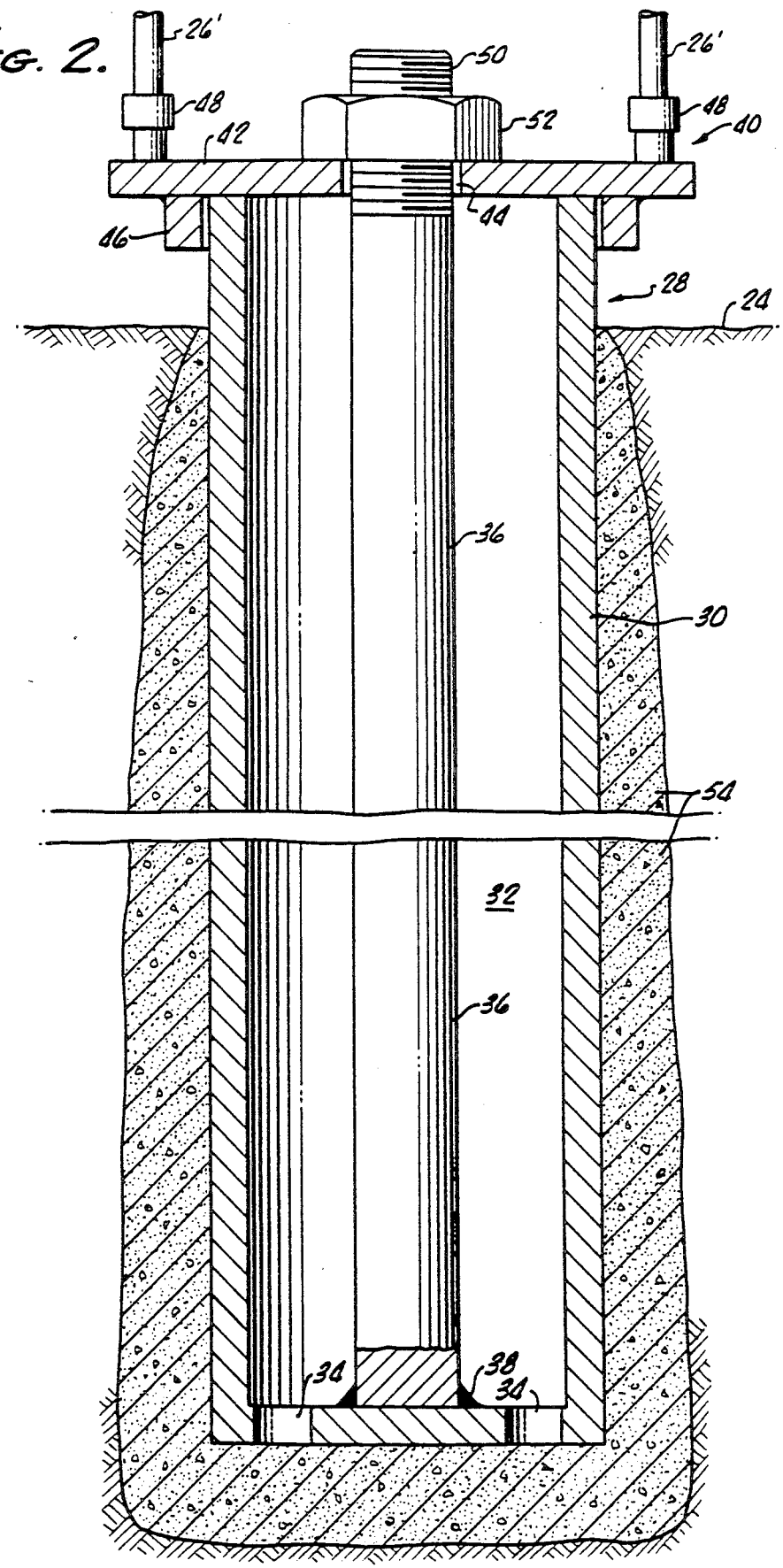

APPARATUS AND METHOD FOR MOORING A FLOATING VESSEL

The present invention broadly relates to mooring a floating vessel in deep water. It particularly relates to the mooring of an offshore platform of the type used for the drilling and production of oil from subterranean formations. A unique aspect of the present invention is the manner in which a tension line is connected to an underground pile.

In recent years there has been a continuing decline in worldwide petroleum reserves. During this same time frame, there also has been a substantially increased demand for petroleum and petroleum products. These two factors have resulted in continued efforts to produce petroleum from subterranean formations located in increasingly difficult environments. An example is the continuing effort to produce crude oil and natural gas from subterranean formations lying at ever increasing depths beneath the world's oceans.

As is well known in the art, crude oil and natural gas have been produced from oil-bearing subterranean formations in relatively shallow waters for many years. In shallow water, the offshore platforms were supported from the ocean floor by rigid support members. Obviously, the depth of water for which such a system is suitable is limited.

More recently large deposits of subterranean oil and natural gas have been discovered in ocean waters which are of a depth such that the conventional types of offshore platforms were no longer practical. These deep water discoveries led to the development of a new type of platform frequently referred to as a tension leg platform. Such platforms generally comprise a floating platform which includes a buoyancy section for supporting the working level of the platform. The platform is positioned over foundations positioned on the ocean floor at a desired site. Thereafter the platform is secured to the foundations by tensioning elements. The tensioning elements are placed in tension to hold the tension leg platform in position at a level in the water such that platform movement as a result of wave motion is substantially reduced. While some vertical movement may occur due to stretching or contraction of the tensioning elements, the elements are always in tension so that the platform does not tend to move vertically with wave action and the like. As a result a relatively stable platform is provided for use in drilling wells in the ocean floor and producing fluids therefrom.

A major problem associated with the use of a tension leg platform or any other floating vessel is maintaining the platform substantially vertically above the wellhead. A particularly difficult problem is the manner in which the tensioning elements interconnecting the vessel with the sea floor are affixed to the sea floor.

Typically, a pile comprising a steel cylinder is imbedded into the sea floor. A tension member is affixed to the top of the cylinder and extends upwardly to the vessel. Obviously, the compactness and strength of the sea bed will vary from one location to another as well as with depth. In addition, the vertical loading will vary considerably with the height of the waves, mass of the vessel and tides, among other things. Further, there may be substantial transverse or lateral loads resulting from tides and the effect of wind upon the vessel. It also will be appreciated that all of these various loads are substantially cyclic in nature. Such cyclic vertical and lateral loading can cause the housing to break loose from the surrounding soil, the results of which would be catastrophic if the vessel drifted a sufficient distance to sever the production lines interconnecting it and the underwater wellhead.

Various methods have been proposed to overcome these problems. One of the simplest and potentially lowest cost systems comprises a single anchor line extending from the vessel to the sea bed where it interconnects with a group of chains for holding the lower end of the anchor line and limiting movement of the vessel; U.S. Pat. No. 3,979,785 describes a system of this type.

One major problem with this type of system is that while the use of chains to hold the bottom of an anchor line minimizes the difficulties associated with a plurality of anchors, it results in a very low restoring force for urging the vessel back to its desired position. Another disadvantage is that it is extremely difficult to set up the system and test it. It is even more difficult to reestablish connection to a vessel after the vessel has sailed away and then returned.

In U.S. Pat. No. 4,727,819, there is described another single anchor line system comprising a primarily vertical anchor chain extending from the surface vessel down to a chain table, which is in turn anchored by a plurality of chains laying on the ocean floor.

In U.S. Pat. No. 4,301,760, there is proposed a more complex method of positioning a vessel above a deep sea well. In accordance with the method disclosed therein, the ship is coupled to the sea floor by a plurality of anchors. The position of the ship is monitored and propellers on the ship activated when required to maintain the ship within a predetermined generally circular area.

Obviously, there still is a need for a reliable means of positioning a floating vessel above a deep sea wellhead.

BRIEF DESCRIPTION OF THE DRAWINGS

FIG. 1 is an elevational view of an offshore platform anchored with tension lines to an underwater anchor pile.

FIG. 2 is a schematic sectional view of an underwater anchor pile constructed in accordance with the present invention.

SUMMARY OF THE INVENTION

Broadly, the present invention provides a mooring apparatus comprising an elongated housing which extends a substantial depth into a sea floor. The elongated housing has an upper end adjacent the surface of the sea floor and includes a vertical passageway extending substantially therethrough. The apparatus further includes a tension member located within the passageway having an upwardly extending end for connection to a floating vessel and a lower end connected to a lower portion of the elongated housing.

A principal advantage of the present invention is that the cyclic vertical loads resulting from wave motion on the floating vessel are transmitted to a lower portion of the elongated housing where the sea bed is stronger and better able to resist such loads. In addition, since the vertical load places the elongated housing in compression, any poisson effect works as an advantage. More particularly, the compressive forces on the housing will cause the housing to distort radially outward, thereby increasing its resistance to being pulled out of the sea bed.

In accordance with one preferred embodiment of the invention, there also is provided a cap means adjacent an upper surface of the housing for interconnecting the tension member in the passageway and one or more tension lines extending upwardly for connection to a floating vessel.

The present invention provides an apparatus for mooring a floating vessel which has a substantially greater resistance to cyclic loading. It also provides an underwater anchor having an unique design which permits the lateral loading factors to be decoupled from the vertical loading factors for design considerations. A particular advantage of the invention is that it provides an underwater anchor pile having an unique design such that any poisson effect from vertical loading is an advantage rather than a detriment. These and other advantages of the invention will be more apparent from the following description of the drawings in which the best mode of the invention is shown.

DETAILED DESCRIPTION OF THE INVENTION

The present invention will be described with respect to what is now its most preferred application, namely, mooring a floating vessel above a deep sea wellhead which is located adjacent the sea floor. Referring to FIG. 1 therein is depicted a deep sea platform 10 of a type used for drilling underwater wells and the production of oil and gas therefrom. Platform 10 generally includes a working deck 12 located above a water surface 14. Platform 10 is supported by a plurality of buoyant caissons 16 which are generally cylindrical and extend a substantial depth below water surface 14. Platform 12 further includes a drilling rig 18 and other drilling and production equipment (not shown). From a bottom portion of platform 10 there typically will extend a plurality of riser pipes 20 connected to a wellhead 22 at the sea floor 24 which may be at a depth of 1000 feet or more.

Platform 10 is maintained in position over wellhead 22 by a mooring apparatus which typically comprises tension lines 26 interconnecting buoyant caissons 16 with anchor pile assemblies 28. Typically there will be provided at least one anchor pile assembly 28 for each caisson 16. Tension line 26 may be a single line or a plurality of lines interconnecting an anchor pile and its respective caisson. Either cable or chain may be used. In addition it is contemplated and preferred that a series of steel pipes threaded end to end be utilized for tension line 26.

Referring now to FIG. 2 therein is depicted an anchor pile assembly 28 constructed in accordance with a preferred embodiment of the present invention. Anchor pile assembly 28 comprises an elongated housing 30 having an upper portion extending above sea floor 24 and a lower portion extending a substantial depth into the sea floor. Typically, housing 30 will be a cylindrical steel tank having a diameter of from about 3 to 7 feet, a wall thickness of from about 1 to 4 inches and extend into sea floor 24 a depth of from 200 to 400 feet. Housing 30 further includes an inner passageway 32 extending substantially throughout its length. Optionally, housing 30 may include one or more openings 34 adjacent a bottom portion of housing 30 (the purpose of which will be described later).

Located within passageway 32 is an inner tension element 36 which extends substantially vertically throughout the length of passageway 32. A lower end of inner tension element 36 is affixed to a lower portion of housing 30. For convenience, the manner in which inner tension element 36 is affixed to housing 30 is depicted as a weld 38. It will be readily apparent that any other means of mechanically connecting element 36 to housing 30, either directly or indirectly, could be utilized. Inner tension element 36 need not be fastened to the very bottom of housing 30. However, to obtain the full effect of the present invention it preferably is secured to housing 30 at a point at least 50%, preferably 70% and even more preferably at least 90% down its vertical length. The purpose for doing this is to ensure that any vertical load placed on inner tension element 36 is transmitted to a lower portion of housing 30 and thus places the majority of housing 30 under a compression load.

To further ensure that substantially all of the vertical load is transmitted to the lower portion of housing 30, passageway 32 will be provided with a cross sectional area greater than that of inner tension element 36. Inner tension element 36 may take many forms. It may comprise one or more solid steel elements, a plurality of cables, pipes or chains. The selection will be principally one of design choice. It is a key aspect of the present invention however that the yield strength of inner tension element 36 be greater than that of housing 30 to ensure that inner tension element 36 will be able to compress housing 30. Accordingly, inner tension element 36 will be designed to have a tensile yield strength of at least 10% preferably at least 30% and most preferably at least 60% greater than the compressive yield strength of housing 30.

Located adjacent an upper end of housing 30 is a cap assembly 40. Cap assembly 40 comprises a plate portion 42 provided with an opening 44 through which passes an upper part of tension element 36. Cap assembly 40 further includes a downwardly projecting flange portion 46 which extends substantially about an upper periphery of housing 30 to substantially prevent any horizontal motion of plate portion 42. This, in turn, ensures any horizontal forces imposed on cap assembly 40 are transmitted to the upper portion of housing 30. While flange portion 46 is depicted as a single continuous member located about an exterior periphery of the upper portion of housing 30, it also could project downwardly inside housing 30 and achieve the same result. In addition, flange portion 46 could comprise a plurality of discrete segments. The essential function of flange portion 46 is to transmit substantially all horizontal force components acting upon cap assembly 40 to the upper portion of housing 30. To further this function the clearance between flange portion 46 and the upper portion of housing 30 advantageously will be less than the clearance between an inner periphery of opening 44 and an outer periphery of the upper portion of inner tension element 36. This will further ensure that substantially no horizontal loads are transmitted to inner tension element 36 by cap assembly 40.

Adjacent an upper surface of plate portion 42 there is provided at least one and preferably a plurality of attachment means 48 for inner connecting cap assembly 40 with at least one external tension element 26. It is possible and within the scope of the invention to utilize a single tension element extending from the lower portion of housing 30 at one end and terminating in a connection to platform 10 at the other end as suggested in FIG. 1. However, the particularly preferred embodiment depicted in FIG. 2 utilizes a plurality of external tension elements 26. The manner in which tension elements 26' are attached to cap assembly 40 is not critical. They may be attached by simple mechanical means such as an eye and hook, threaded fasteners or even welded. Preferably, attachment means 48 is of a type which permits remote connecting and disconnecting controlled from, for example, platform 10. For an example of this type of attachment means see U.S. Pat. No. 4,702,321 issued Oct. 27, 1987.

Cap assembly 40 is not mechanically attached to housing 30 to ensure that substantially all vertical loads are transmitted to a lower portion of housing 30. Cap assembly 40 is, however, secured to inner tension element 36. This is readily accomplished utilizing conventional means such as welding, mechanical fasteners, and the like. Preferably, it is secured as schematically depicted in such a manner that it is held by inner tension element 36 against an upper most portion of housing 30. For the purpose of illustration this is depicted as being accomplished by a nut 52 attached to a threaded portion 50 of inner tension element 36. It will be appreciated that in actual practice numerous other means could be used such as jacks, levers, hydraulic actuators and the like.

A particular advantage of the arrangement depicted is that it permits pre-tensioning of inner tension element 36 which in turn applies compressive forces to housing 30 to deliberately deform housing 30 radially outward and further increase its resistance to being pulled out of sea floor 24. Alternatively, the pre-tensioning may be done in an amount such that deformation of housing 30 occurs only when the pre-tensioning load is combined with the design load or maximum design pull out load.

To install the apparatus of the present invention, housing 30 is embedded or implanted in sea floor 24. This may be accomplished utilizing an underwater hammer to drive housing 30 into sea floor 24. Alternatively, a hole is drilled in sea floor 24 and thereafter housing 30 is lowered into it. In such latter instance it also is essential to use a grouting to cement housing 30 in the hole. Typically, the grouting is pumped down through inner passageway 32 of housing 30 and out through openings 34. The grouting is forced outwardly and flows upwardly around the outer periphery of housing 30. Once the grouting has set or hardened, cap assembly 40 may be placed in position and tension lines 26 connected to the cap and the vessel to be moored. Obviously, grouting also could be used when the housing is hammered into sea floor 24.

To demonstrate an advantage of the present invention, theoretical calculations were made comparing a pile constructed in accordance with present invention with one constructed in accordance with the prior art (a tension line connected at the top). It was determined that a three foot diameter, 80 foot long pile, in soil which has a shear strength profile of 250 pounds per square feet at the sea floor increasing linearly to 2,000 pounds per square feet at a depth of 80 feet, can be pulled upward 0.1 inch with a 237 ton load attached to the top of the pile. It has generally been considered that a displacement of 0.1 inch be the maximum tolerable displacement before classifying a pile as having failed.

By pulling upward from the bottom of an anchor pile constructed as taught herein, it was calculated that a pull out load of 330 tons would be required to displace the pile 0.1 inch, a 39% increase. It is anticipated that, by optimizing the design and amount of pre-tension applied, an increase in pull out strength of at least 45% and probably in excess of 55%, as compared to a prior art pile, will be readily obtainable. In addition, since the pile is more resistant to initial displacement with a bottom connection, the degrading effects of cyclic loading and creep also are substantially reduced. It will be appreciated that the cost of constructing and installing these underwater piles is tremendous. If the depth to which they must be implanted or their number reduced, the savings would be truly substantial.

The present invention has been described with respect to what is now considered its best embodiment and preferred application. Many modifications and variations of the design depicted will be readily apparent to those skilled in the art. For example, in some instances it may be advantageous to fill the interior space of the anchor pile of the present invention with a ballast material to add to its resistance to tension loads. Typical ballast materials having a density greater than water include lead, iron and steel in the form of blocks, pellets and the like which do not impose vertical restraint on the inner tension member. Accordingly, the scope of the invention should not be determined in accordance with the illustrative embodiment depicted since it is anticipated that such variations and modifications will fall within the scope and spirit of the appended claims.

What is claimed is:

1. A mooring apparatus comprising an elongated housing extending a substantial depth into a sea floor and having a vertically extending passageway therethrough, an inner tension member located within and extending upwardly through the passageway, the inner tension member having an end connected to a lower portion of the elongated housing and an opposite upwardly extending end for connection to a cap means, an outer tension member having an end connected to said cap means and an upwardly extending end for connection to a floating vessel, said cap means including a downwardly extending portion located substantially about an outer periphery of the upper portion of the elongated housing for transmitting horizontal forces to an upper portion of said elongated housing and means for pretensioning said tension member.

2. The apparatus of claim 1 wherein said housing further includes an opening in a lower portion thereof for the passage therethrough of a grouting material.

3. The apparatus of claim 2 further comprising a body of grout surrounding said elongated housing.

4. The apparatus of claim 1 wherein the apparatus comprises a plurality of outer tension members.

5. The apparatus of claim 3 wherein said outer tension member comprises a plurality of tension members.

6. The apparatus of claim 1 further comprising means for ensuring that substantially any vertical load transmitted to any tension member is transmitted to the lower portion of the elongated housing.

7. Apparatus for mooring a floating vessel above an underwater wellhead located adjacent a sea floor, the apparatus comprising, a plurality of elongated housings, each having an upper and lower end, the upper ends being located adjacent the sea floor and the lower ends extending a substantial distance downwardly into the sea floor, the elongated housings being located radially about the well head and each of the housings having an axially, vertically extending passageway therethrough and an opening in a lower portion thereof for the passage therethrough of a grouting material at least one inner tension element extending through each of the passageways having a lower end connected to a lower portion of the elongated housing and an upper end connected to a lower end of a plurality of outer tension elements, said outer tension elements having an upper end for connection to the floating vessel, and a cap assembly located adjacent the upper end of each of the elongated housing for interconnecting the inner tension elements and the outer tension elements.

8. The apparatus of claim 7 wherein the inner tension elements within an elongated housing has a tensile yield strength at least 30 percent greater than the compressive yield strength of the elongated housing.

9. The apparatus of claim 8 wherein the cap assembly is provided with a downwardly extending flange member adjacent a periphery of the upper end of the elongated housings.

10. The apparatus of claim 9 further comprising a body of grouting material located about an outer periphery of the elongated housing at least adjacent the lower end thereof for cementing the housing to the sea bed.

11. The apparatus of claim 8 further including means for pre-tensioning the inner tension elements.

12. A method for mooring a floating vessel above a deep sea wellhead which is located adjacent a sea floor, said method comprising: implanting an elongated housing having opposite ends into the sea floor such that one end of said housing is adjacent the sea floor and the opposite end extends downwardly into the sea floor, providing in said housing an axially, vertically extending passageway therethrough, disposing a tension member in the passageway, connecting one end of the tension member to a lower portion of the elongated housing and connecting an opposite end to the floating vessel, and ensuring that any vertical load from the vessel is transmitted through the tension member to the lower portion of the elongated housing.

13. The method of claim 12 further including providing a grouting material around an outside periphery of the elongated housing for securing the housing to the sea floor.

14. The method of claim 12 wherein the floating vessel comprises a platform supported by a plurality of buoyant caissons and there is provided at least one elongated housing and tension member for each caisson.

15. The method of claim 14 wherein the elongated housings are disposed radially about the wellhead.

16. The method of claim 12 further comprising providing a cap means located adjacent an upper end of the elongated housing.

17. The method of claim 16 wherein the tension member comprises a plurality of elements, at least one substantially rigid inner element extending substantially throughout the length of the elongated housing, and a plurality of external elements extending from the housing to the vessel.

18. The method of claim 12 wherein the tension member comprises a cable.

19. The method of claim 12 wherein the tension member comprises a chain.

20. The method of claim 12 wherein the elongated housing comprises a steel cylinder.

21. Apparatus for mooring an offshore platform supported by a plurality of buoyant caissons above an underwater wellhead located adjacent a sea floor, the apparatus comprising: a plurality of elongated substantially cylindrical housings, each having an upper end and a lower end, the upper ends extending above the sea floor and the lower ends extending a substantial distance downwardly into a sea floor, the housings being located radially about the wellhead, at least one housing is provided for each buoyant caisson, and each of the housings having a vertically extending passageway therethrough and a passageway in a lower portion thereof for the passage therethrough of a grouting material, and a tension member extending through each of the passageways, the tension member having a lower end connected to a lower portion of the housing and an upper end for connection to a caisson, each tension member comprising at least one inner tension element and at least one outer tension element, said inner and outer tension elements being interconnected by a cap assembly located adjacent the upper end of each of the elongated housing, said cap assembly having a downwardly extending flange member adjacent a periphery of the upper end of the elongated housing.

22. The apparatus of claim 21 further comprising means for ensuring that substantially any vertical load transmitted to the tension member is transmitted to the lower portion of the elongated housing.

23. The apparatus of claim 21 wherein the outer tension element comprises a plurality of steel pipes connected end to end.

24. The apparatus of claim 23 further comprising a plurality of outer tension elements for each cap assembly.

25. The apparatus of claim 23 further comprising a body of a grouting material located around an outside periphery of each housing for securing the housing to the sea floor.

26. The apparatus of claim 21 wherein the inner tension elements within an elongated housing has a tensile yield strength at least 30 percent greater than the compressive yield strength of the elongated housing.

27. The apparatus of claim 21 wherein the elongated housing is a cylindrical steel tank having a diameter of from about 3 to 7 feet and a length of from 200 to 400 feet.

28. A mooring apparatus comprising a substantially cylindrical housing having opposite ends and extending a substantial length along an axis for placement in a sea floor and having a passageway extending therethrough, an inner tension member located within said passageway having an end affixed to one end of said housing, a cap means located adjacent the upper end of said housing and connected to another end of said inner tension member, said cap means including a portion extending along said axis for transmitting horizontal forces applied to the cap means to the housing, said cap means including means for attachment of an outer tension member, said inner tension member having a tensile yield strength at least 30 percent greater than the compressive yield strength of the elongated housing.

29. The apparatus of claim 28 wherein said housing has a length of from about 200 to 400 feet.

30. The apparatus of claim 28 wherein said housing has a diameter of from about 3 to 7 feet.

31. The apparatus of claim 30 wherein said inner tension member has a tensile yield strength at least 60 percent greater than the compressive yield strength of the housing.

* * * * *